United States Patent [19]

McLoughlin

[11] Patent Number: 4,652,033
[45] Date of Patent: Mar. 24, 1987

[54] NON SNAGGING AIRPLANE PICK-UP HOOK

[76] Inventor: John McLoughlin, 92 Mobrey La., Smithtown, N.Y. 11787

[21] Appl. No.: 567,697

[22] Filed: Jan. 3, 1984

[51] Int. Cl.4 ............................................... B66C 1/34
[52] U.S. Cl. ..................................... 294/82.1; 294/26; 294/66.1
[58] Field of Search ................ 294/82 R, 78 R, 66 R, 294/26; 43/1, 5, 43.1, 43.16, 43.4, 44.82; 114/294, 301, 302, 303, 304; 244/1 TP, 110 F

[56] References Cited

U.S. PATENT DOCUMENTS 2,411,318 11/1946 Del Bagno ............................ 294/26
4,108,484 8/1978 Malroit ............................... 294/82.1

Primary Examiner—James B. Marbert
Attorney, Agent, or Firm—James P. Malone

[57] ABSTRACT

Non snagging airplane pick-up hook has a long shank member with an eye connection at one end of the shank member. A plurality of hook members are mounted on the other end of the shank member, each hook member terminating in a portion curved back on itself, whereby snagging of the hook while picking up objects or banners is minimized.

2 Claims, 3 Drawing Figures

NON SNAGGING AIRPLANE PICK-UP HOOK

TECHNICAL FIELD

This invention relates to airplane pick-up hooks and more particularly to non snagging hooks.

BACKGROUND ART

Airplanes frequently pick-up objects from the ground, for instance advertising banners which they tow, for instance, along a beach or other crowded areas.

When planes pull the advertising banners they must take off without them and then pick them up. This is done with a hook hanging from a rope that hangs from the tail of the plane. If the plane gets too low, the hook could hit the ground. If the hook gets caught on something on the ground, the cable could be over-stressed and break. If the cable doesn't give, the tail could be over-stressed and cause structual failure to the plane. The more common thing to happen is for the hook to spring back up to the plane and get caught in the tail surfaces. If this happens, the plane will most certainly be out of control. Many pilots and planes have been lost this way.

THE INVENTION

The present invention is a non snagging hook having a plurality of hook members terminating in the end portions with curved back on themselves so that they cannot dig into the ground, trees or other objects.

OBJECTS OF THE INVENTION

The principal object of the invention is to provide new and improved airplane pick-up hook means.

Another object of the invention is to provide new and improved non snagging airplane pick-up hook means.

Another object of the invention is to provide new and improved non snagging airplane pick-up hook comprising: a long shank member, an eye connection at one end of the shank member, a plurality of hook members mounted on the other end of the shank member, each hook member terminating in a portion curved back on itself.

BRIEF DESCRIPTION OF THE DRAWINGS

These and other objects of the invention will be apparent from the following specification and drawings of which.

BEST MODE OF THE INVENTION

Figure 1:
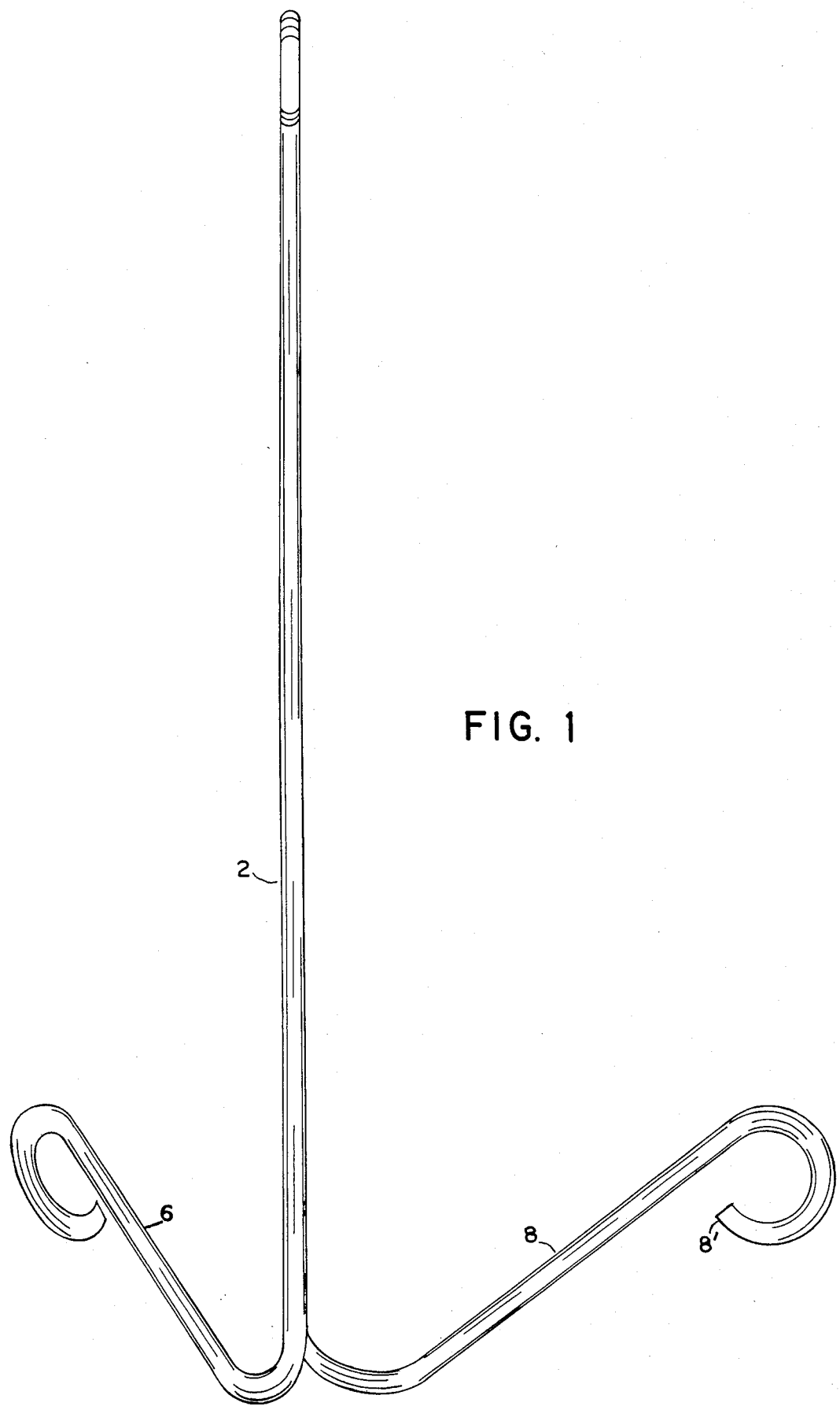
FIG. 1 is a top view of an embodiment of the invention.
Figure 2:
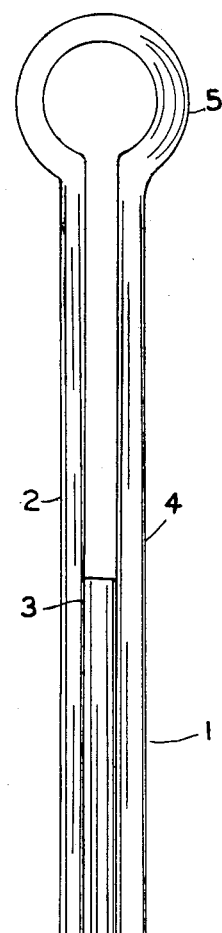
FIG. 2 is a side view of FIG. 1.
Figure 2:
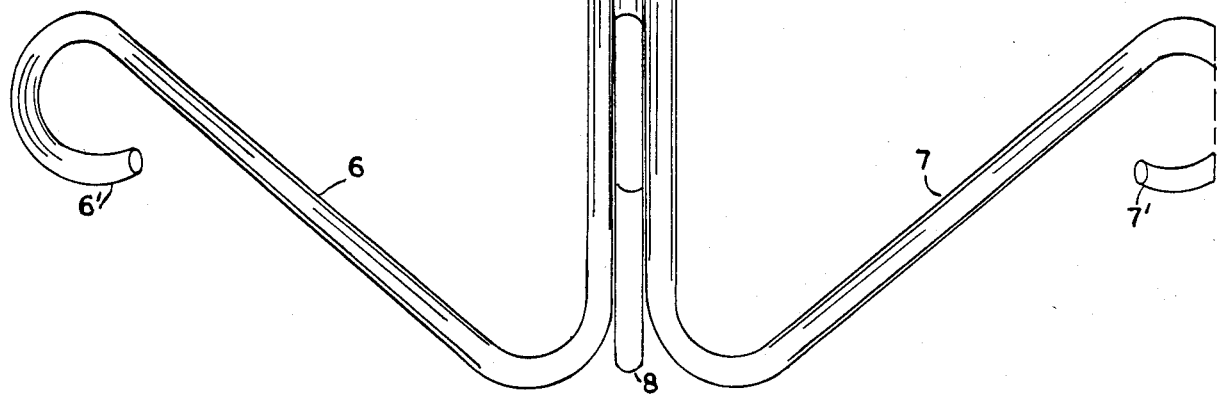
Figure 3:
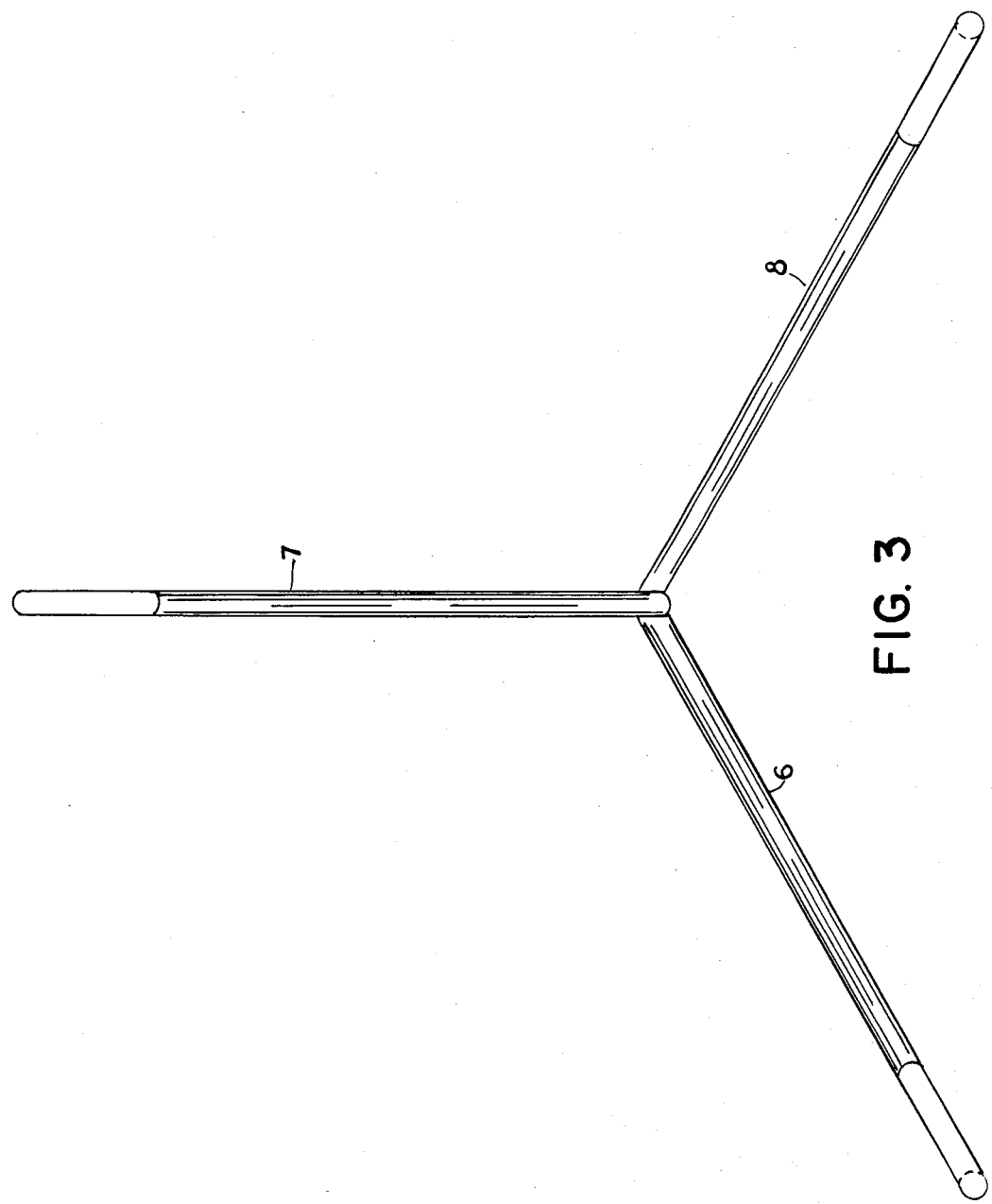
FIG. 3 is an end view of FIG. 1.

Referring to the drawings, the invention comprises a shank means 1, which comprises three elongated members 2, 3 and 4. The members 2 and 4 are integral and form an eye connection 5. The other end of the shank shaft comprises a plurality of hooks 6, 7, 8. Each of the hook members terminates in a portion 6', 7' and 8', which curves back on itself presenting a shape which will not dig into the ground or trees, since there are no sharp ends on the hook.

Therefore, when the hook is towed by an airplane to pick-up an advertising banner or other objects, for instance, mail bags, it is unlikely that the hook will dig into the ground because of the curved configuration of the ends of the hook members and the fact that there are four hook members spaced 120 degrees apart.

It is claimed:

1. Non snagging airplane pick-up hook comprising:
   a long shank member,
   an eye connection at one end of the shank member,
   a plurality of hook members mounted on the other end of the shank member, each hook member terminating in a portion curved back on itself,
   whereby snagging of the hook while picking up objects or banners is minimized.

2. Apparatus as in claim 1 having three hook members spaced 120 degrees apart.

* * * * *